United States Patent
Chae et al.

(10) Patent No.: US 11,452,002 B2
(45) Date of Patent: Sep. 20, 2022

(54) METHOD WHEREBY TERMINAL TRANSMITS DEVICE-TO-DEVICE (D2D) SIGNAL IN WIRELESS COMMUNICATION SYSTEM THAT SUPPORTS D2D COMMUNICATION, AND APPARATUS THEREFOR

(71) Applicant: LG ELECTRONICS INC., Seoul (KR)

(72) Inventors: Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 16/648,063

(22) PCT Filed: Sep. 19, 2018

(86) PCT No.: PCT/KR2018/011074
§ 371 (c)(1),
(2) Date: Mar. 17, 2020

(87) PCT Pub. No.: WO2019/059649
PCT Pub. Date: Mar. 28, 2019

(65) Prior Publication Data
US 2020/0221335 A1    Jul. 9, 2020

Related U.S. Application Data

(60) Provisional application No. 62/636,829, filed on Feb. 28, 2018, provisional application No. 62/560,669, filed on Sep. 19, 2017.

(51) Int. Cl.
*H04B 17/318* (2015.01)
*H04W 74/08* (2009.01)
(Continued)

(52) U.S. Cl.
CPC ... *H04W 28/0289* (2013.01); *H04W 72/0486* (2013.01); *H04W 92/18* (2013.01)

(58) Field of Classification Search
None
See application file for complete search history.

(56) References Cited

U.S. PATENT DOCUMENTS

2016/0157254 A1\* 6/2016 Novlan ................ H04W 72/10
                                                         370/329
2017/0041891 A1\* 2/2017 Chae .................. H04W 56/001
(Continued)

OTHER PUBLICATIONS

PCT International Application No. PCT/KR2018/011074, Written Opinion of the International Searching Authority dated Jan. 11, 2019, 16 pages.
(Continued)

*Primary Examiner* — Sithu Ko
(74) *Attorney, Agent, or Firm* — Lee Hong Degerman Kang Waimey

(57) ABSTRACT

Disclosed are a method whereby a terminal transmits a device-to-device (D2D) signal in a wireless communication system that supports D2D communication according to various embodiments, and an apparatus therefor. Disclosed are a method whereby a terminal transmits a D2D signal, and an apparatus therefor, wherein the method comprises: a step of measuring a technology congestion level with regard to a predetermined resource area; and a step of determining a wireless technology that is to be used for the 2D2 signal transmission on the basis of the technology congestion level, and transmitting the D2D signal on the basis of the determined wireless technology, and wherein the technology congestion level is related to the proportion of received signals that include information regarding the usage of a particular wireless technology in the predetermined resource area.

9 Claims, 17 Drawing Sheets

(a)

(b)

(51) Int. Cl.
*H04W 28/02* (2009.01)
*H04W 72/04* (2009.01)
*H04W 92/18* (2009.01)

(56) References Cited

U.S. PATENT DOCUMENTS

| | | | |
|---|---|---|---|
| 2017/0064660 A1* | 3/2017 | Chen | H04W 56/0025 |
| 2017/0181150 A1* | 6/2017 | Lee | H04W 72/1257 |
| 2017/0188320 A1* | 6/2017 | Xiong | H04W 72/0453 |
| 2017/0188391 A1* | 6/2017 | Rajagopal | H04W 28/0284 |
| 2017/0201461 A1 | 7/2017 | Cheng et al. | |
| 2017/0238321 A1* | 8/2017 | Sartori | H04W 4/40 |
| | | | 455/452.1 |
| 2017/0245245 A1* | 8/2017 | Kim | H04W 72/1284 |
| 2018/0014317 A1* | 1/2018 | Gulati | H04L 5/001 |
| 2018/0048572 A1* | 2/2018 | Gulati | H04W 72/10 |
| 2018/0092065 A1* | 3/2018 | Sheng | H04W 72/048 |
| 2018/0124771 A1* | 5/2018 | Mok | H04W 4/06 |
| 2018/0234898 A1* | 8/2018 | Kahtava | H04W 72/048 |
| 2019/0013881 A1* | 1/2019 | Olesen | H04B 1/10 |
| 2019/0090173 A1* | 3/2019 | Xiao | H04W 4/46 |
| 2019/0150157 A1* | 5/2019 | Panteleev | H04W 76/14 |
| | | | 370/329 |
| 2019/0174547 A1* | 6/2019 | Khoryaev | H04W 72/02 |
| 2019/0208441 A1* | 7/2019 | Wang | H04W 28/0284 |
| 2019/0230631 A1* | 7/2019 | Zhao | H04W 72/0453 |
| 2019/0313279 A1* | 10/2019 | Li | H04W 28/0289 |
| 2019/0349957 A1* | 11/2019 | Sorrentino | H04W 4/90 |
| 2020/0053675 A1* | 2/2020 | Khoryaev | H04L 5/0051 |
| 2020/0275411 A1* | 8/2020 | Tang | H04W 72/02 |

OTHER PUBLICATIONS

Intel, "Resource Selection Latency Reduction for LTE V2V Sidelink Communication", 3GPP TSG RAN WG1 Meeting #90, R1-1712490, Aug. 2017, 5 pages.

Intel, "Support of Higher Order Modulations for LTE V2V Sidelink Communication", 3GPP TSG RAN WG1 Meeting #90, R1-1712483, Aug. 2017, 7 pages.

Intel, "Sharing resource pool for eNB-contrlled and UE-autonomous V2V transmission modes", 3GPP TSG RAN WG1 Meeting #89, R1-1707303, May 2017, 5 pages.

Intel, "Details of congestion control for V2V communication", 3GPP TSG RAN WG1 Meeting #88, R1-1702142, Feb. 2017, 7 pages.

* cited by examiner (a)

(b)

(a)

(b)

(a)

(b)

METHOD WHEREBY TERMINAL TRANSMITS DEVICE-TO-DEVICE (D2D) SIGNAL IN WIRELESS COMMUNICATION SYSTEM THAT SUPPORTS D2D COMMUNICATION, AND APPARATUS THEREFOR

CROSS-REFERENCE TO RELATED APPLICATIONS

This application is the National Stage filing under 35 U.S.C. 371 of International Application No. PCT/KR2018/011074, filed on Sep. 19, 2018, which claims the benefit of U.S. Provisional Application Nos. 62/560,669 filed on Sep. 19, 2017 and 62/636,829 filed on Feb. 28, 2018, the contents of which are all hereby incorporated by reference herein in their entirety.

TECHNICAL FIELD

The present disclosure relates to a wireless communication system supporting device-to-device (D2D) communication, and more particularly, to a method by which a terminal transmits a D2D signal in a wireless communication system supporting D2D communication and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method by which a user equipment (UE) measures a technology congestion level based on the ratio of UEs that use (or do not use) a new ratio technology to UEs in the vicinity thereof and determine, based on the measured technology congestion level, whether to transmit a signal by applying the new radio technology in order to minimize interference and performance degradation of UEs that use other radio technologies different from the new radio technology.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting a device-to-device (D2D) signal by a user equipment (UE) in a wireless communication system supporting D2D communication. The method may include measuring a technology congestion level for a predetermined resource region, determining a radio technology to be applied to D2D signal transmission based on the technology congestion level, and transmitting the D2D signal based on the determined radio technology. The technology congestion level may be related to a ratio of how many times a signal including information on use of a specific radio technology is received in the predetermined resource region.

When the specific radio technology is a first radio technology, if the technology congestion level is greater than or equal to a predetermined threshold, the first radio technology may be determined as the radio technology to be applied to the D2D signal transmission.

When the specific radio technology is a second radio technology, if the technology congestion level is less than the predetermined threshold, the first radio technology may be determined as the radio technology to be applied to the D2D signal transmission.

The first radio technology may be a radio technology related to transmit diversity (TxD), multi-layer transmission, or 64 quadrature amplitude modulation (64-QAM).

The information on the use of the specific radio technology may be obtained based on properties of the signal.

The properties of the signal may include at least one of a CP length, a sequence, and a demodulation reference signal (DMRS) allocated for the signal.

The signal may include indication information indicating a radio technology applied to the signal, and the information on the use of the specific radio technology may be obtained based on the indication information included in the signal.

The information on the use of the specific radio technology may be obtained based on a priority level related to the signal.

The predetermined resource region may be a resource region to which resources for a control signal are allocated.

The technology congestion level may be related to a ratio of control signals including the information on the use of the specific radio technology to control signals received in the predetermined resource region for a predetermined time.

The signal including the information on the use of the specific radio technology may be a signal having received strength greater than or equal to a predetermined threshold.

The technology congestion level may be related to a ratio of subchannels on which the signal including the information on the use of the specific radio technology is received to a plurality of subchannels included in the predetermined resource region.

The method may further include measuring a channel busy ratio (CBR) corresponding to a channel occupation ratio based on strength of a signal received in the predetermined resource region. In this case, the technology congestion level may be calculated in consideration of the ratio of how many times the signal including the information on the use of the specific radio technology is received in the predetermined resource region and the measured CBR.

In another aspect of the present disclosure, provided is a method of controlling, by a base station, D2D signal transmission at a user equipment (UE) in a wireless communication system supporting D2D communication. The method may include receiving information on a technology congestion level for a predetermined resource region from at least one UE, determining, based on the technology congestion level, whether D2D signal transmission to which a first radio technology is applied is allowed, and transmitting, to the at least one UE, information on whether the D2D signal transmission to which the first radio technology is applied is allowed. The technology congestion level may be related to a ratio of how many times a signal including information on use of the first radio technology is received in the predetermined resource region.

The base station may determine whether the D2D signal transmission to which the first radio technology is applied is allowed for each area based on geographical information about the at least one UE, which is received from the at least one UE, and the information on the technology congestion level.

Advantageous Effects

According to the present disclosure, a user equipment (UE) may measure a technology congestion level based on the ratio of UEs that use (or do not use) a new ratio technology to UEs in the vicinity thereof and determine, based on the measured technology congestion level, whether to transmit a signal by applying the new radio technology, thereby minimizing interference and performance degradation of UEs that use other radio technologies different from the new radio technology.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
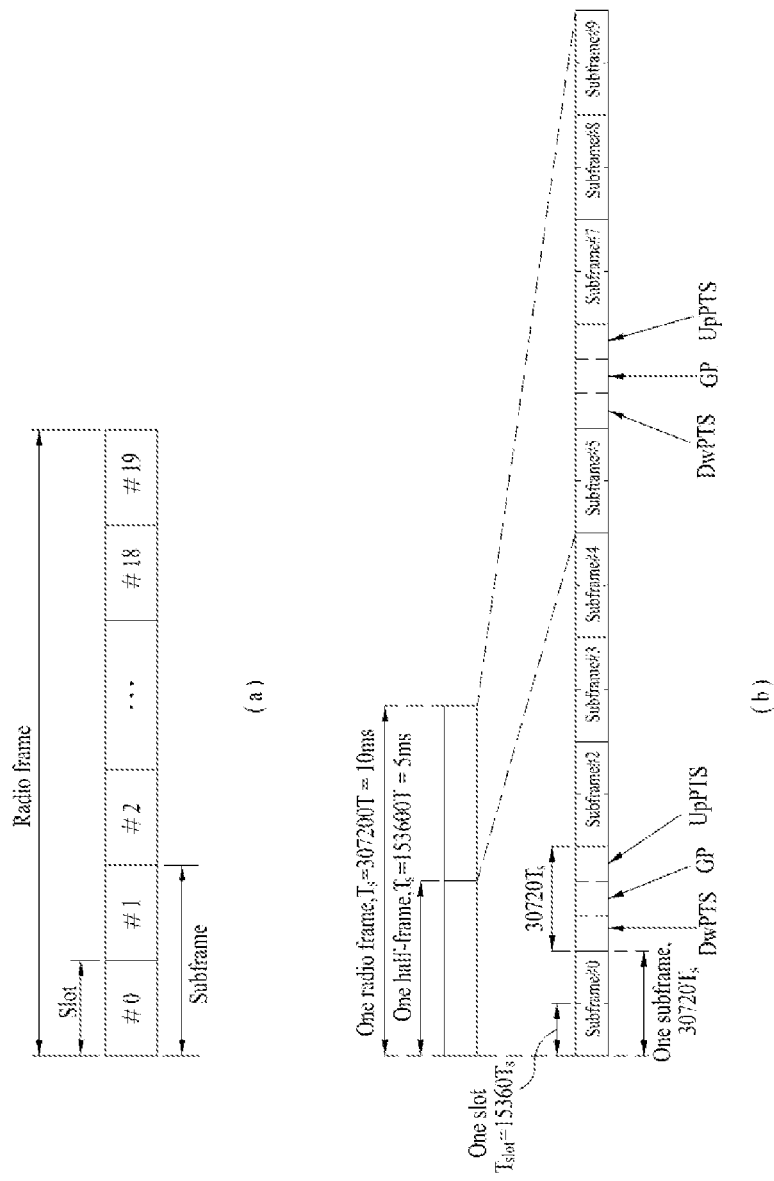
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
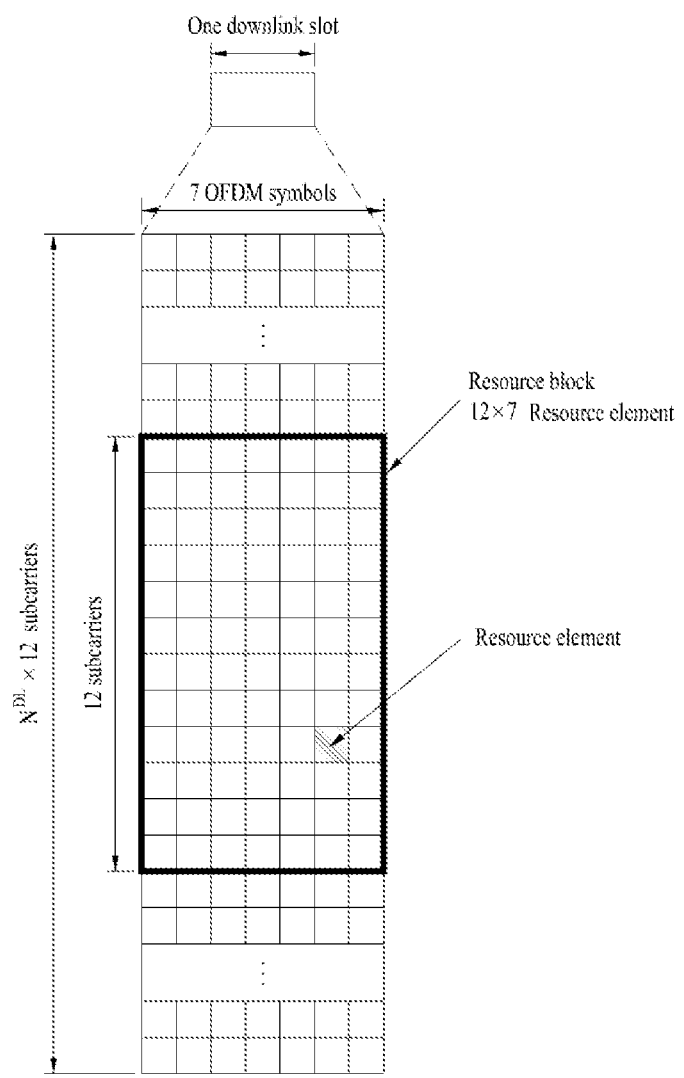
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
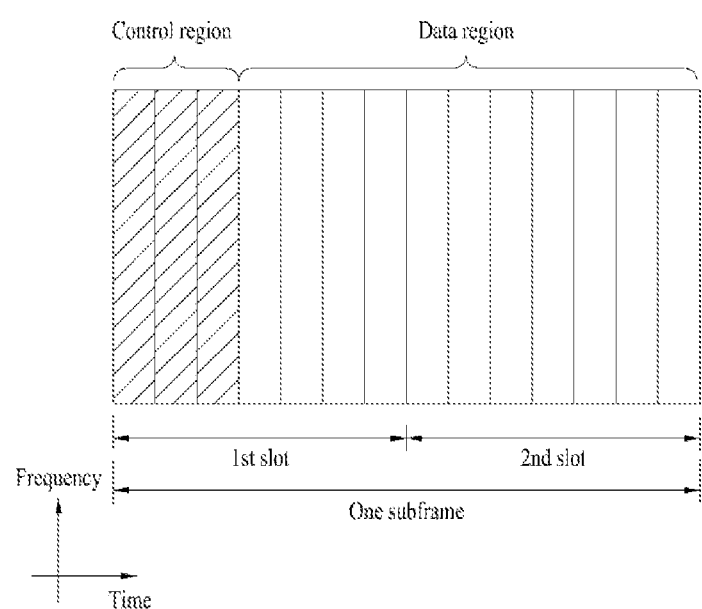
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
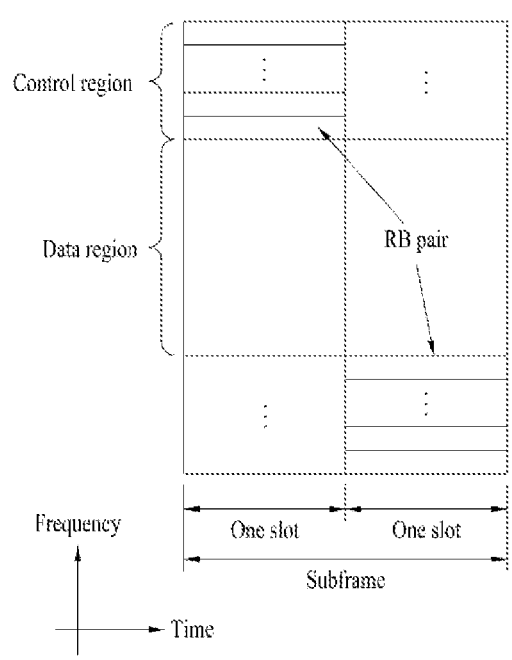
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
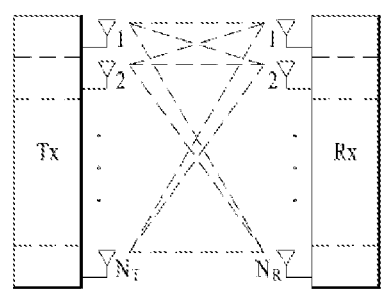
FIG. 5 is a view illustrating the configuration of a wireless communication system having multiple antennas.
Figure 5:
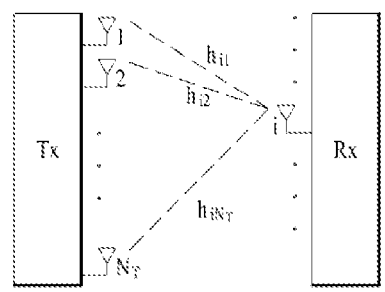

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four $T_x$ antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s=[s_1,s_2,\ldots,s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In addition, can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$ it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
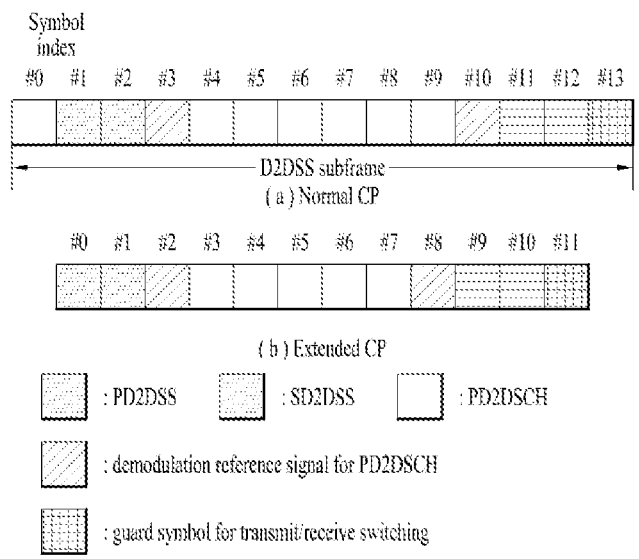
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
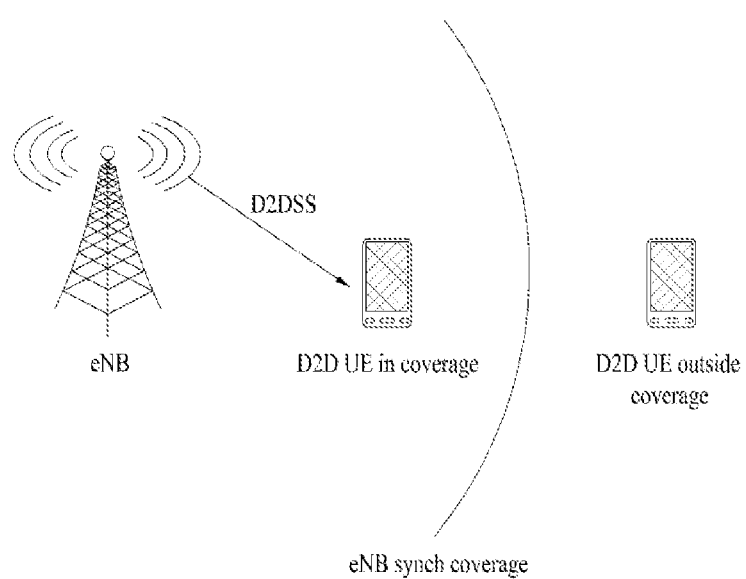
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
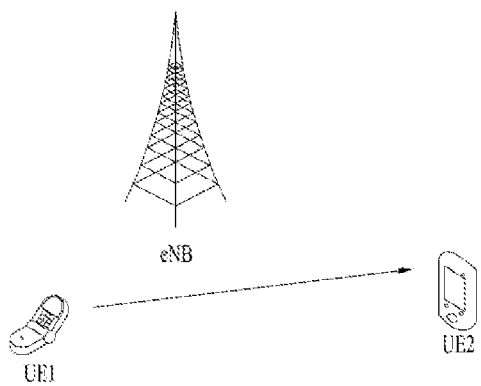
FIG. 8 is a view illustrating an exemplary D2D resource pool for D2D communication.
Figure 8:
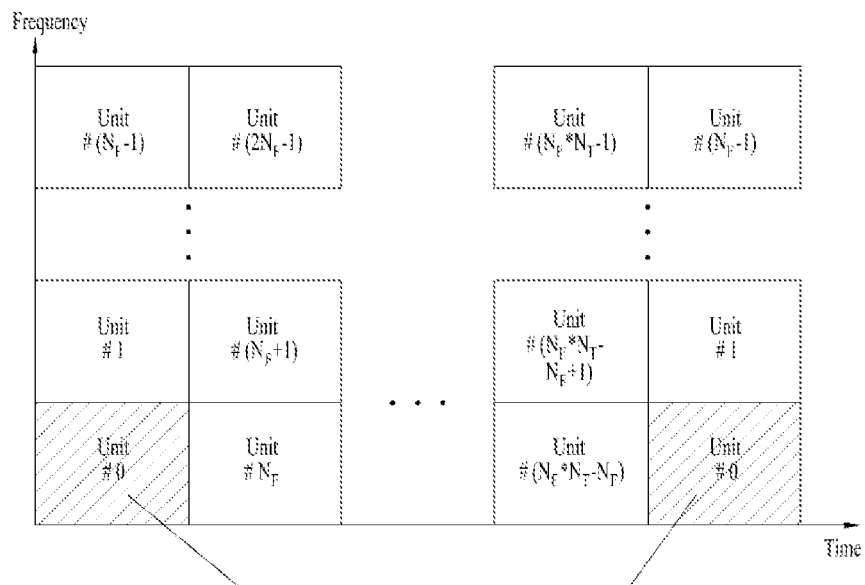

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
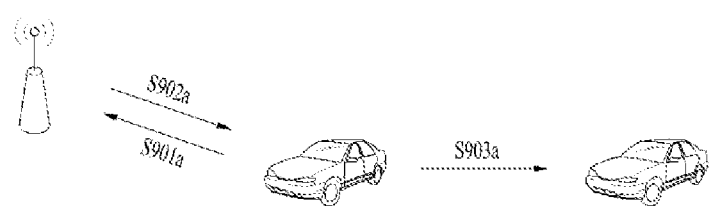
FIG. 9 is a view referred to for describing transmission modes and scheduling schemes for vehicle-to-everything (V2X)
Figure 9:
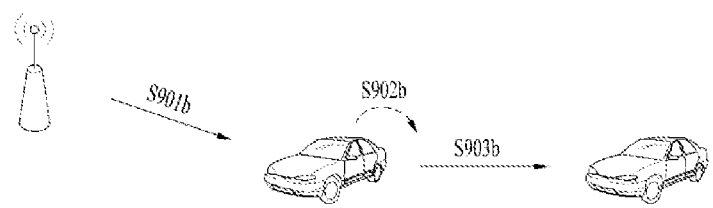
Figure 10:
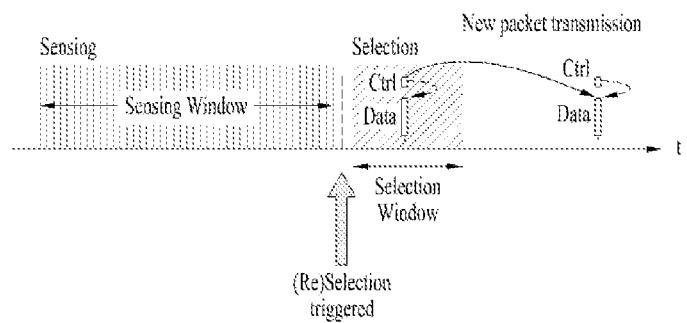
FIG. 10 is a view illustrating a method of selecting resources in V2X.
Figure 11:
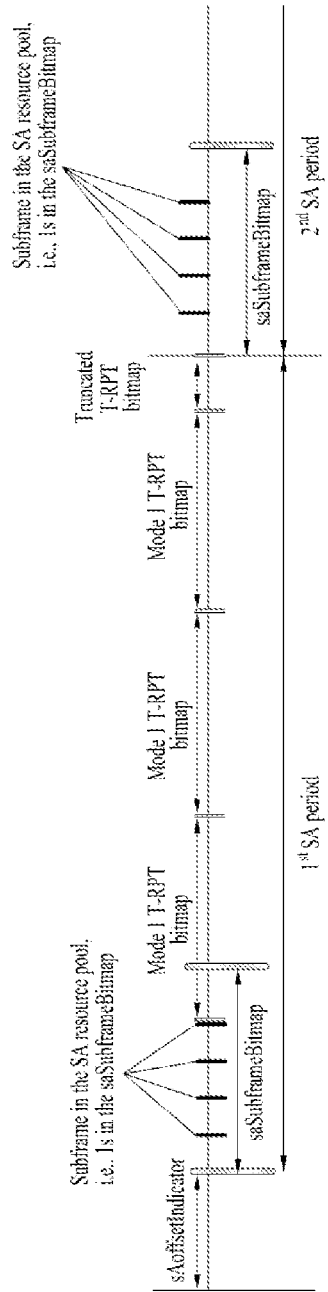
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1 s in a T-RPT bitmap, and one MAC PDU is transmitted four times.

Figure 12:
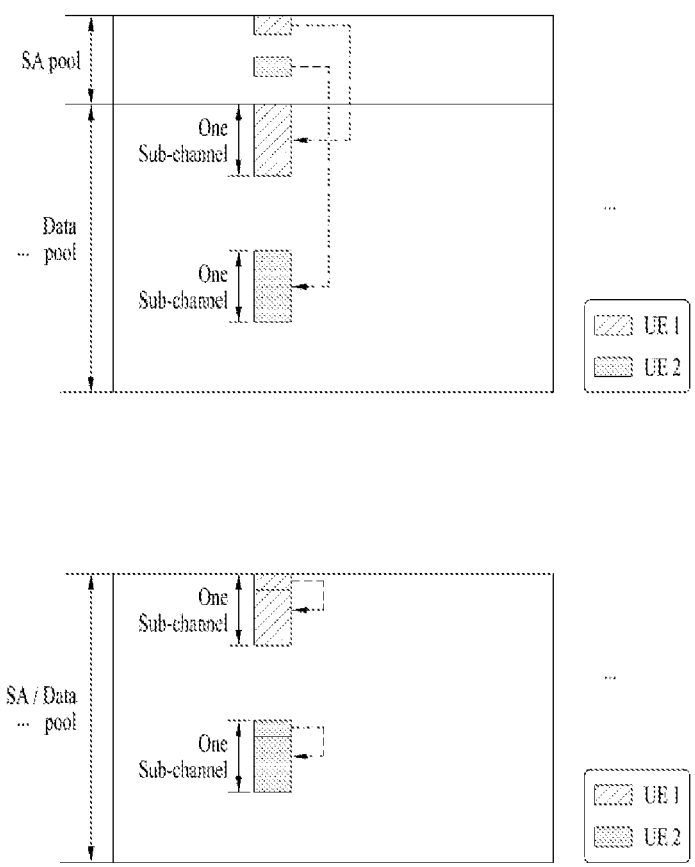
FIG. 12 is a view referred to for describing an SA and data transmission in V2X.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

NR (New RAT (Radio Access Technology))

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
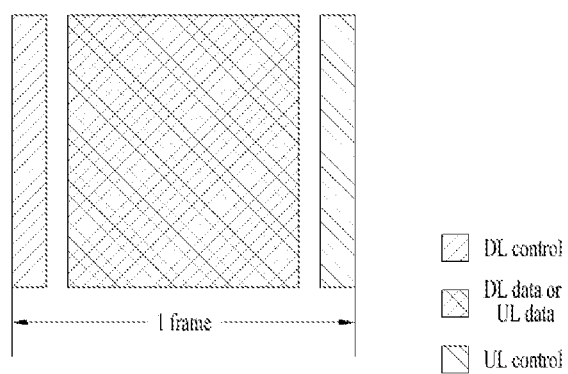
FIGS. 13 and 14 are views illustrating a new radio access technology (NRAT) frame structure.
Figure 14:
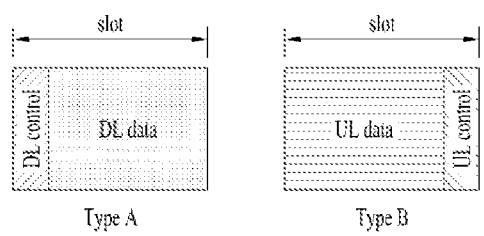
Figure 14:
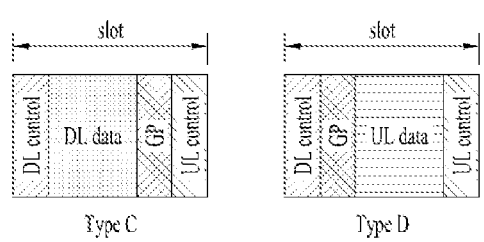

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Technology-Specific Congestion Level Measurement

When a new scheme or radio technology such as transmit diversity (TxD), multi-layer transmission, or higher order modulation (e.g., 64 quadrature amplitude modulation (64-QAM)) is used in physical layers or higher layers, technology-specific congestion level measurement may be used to understand how many neighboring UEs uses the corresponding technology (or how many neighboring UEs do not use the corresponding technology). When such a new technology is used, communication with the new technology may cause unnecessary interference to UEs incapable of supporting the technology, or in some cases, it may disable the UEs from performing reception. Hence, the new technology may need to be allowed under specific conditions.

A UE may know whether a specific technology is applied from a control signal or by performing blind decoding. For example, different technologies may have different demodulation reference signals (DMRSs) for data or control signals or different cyclic prefix (CP) lengths. Specifically, the technology-specific congestion level measurement may be performed based on at least one of: the ratio of how many times a control signal (PSCCH) indicating the use (or disuse) of the specific technology is decoded to the total control signals (PSCCHs) decoded for a predetermined time; the ratio of how many times the control signal (PSCCH) indicating the use of the specific technology is decoded to the total resources for candidate control signals (PSCCHs) for a predetermined time; and the ratio of how many UEs or subchannels have reference signal received power (RSRP) or sidelink received signal strength indicator (S-RSSI), which represents received control signal strength, greater than or equal to a predetermined threshold when one of the aforementioned two conditions is satisfied.

In the above methods, the number or ratio of UEs that use the specific technology for a prescribed period of time is calculated. In particular, to determine whether the technology is used or whether UE uses the technology, control signals are decoded or DMRSs for data or control signals are detected.

Whether the specific technology is used may be mapped to priority levels. That is, the reason for this is that when the specific technology is allowed only for a UE at a specific priority level, the reception performance of data at the corresponding priority level may be improved. In this case, priority-specific congestion level measurement may also be defined. For example, the priority-specific congestion level measurement may be performed based on at least one of: the ratio of how many times a control signal (PSCCH) indicating the specific priority level is decoded to the total control signals (PSCCHs) decoded for a predetermined time; the ratio of how many times the control signal (PSCCH) indicating the specific priority level is decoded to the total resources for candidate control signals (PSCCHs) for a predetermined time; and the ratio of how many UEs or subchannels have received control signal strength (e.g., PSSCH RSRP or S-RSSI) greater than or equal to a predetermined threshold when one of the aforementioned two conditions is satisfied. Alternatively, when a specific technology is associated with a specific priority level, the number of UEs that use the specific technology may be anticipated from the number or ratio of UEs that use the specific priority level among or to neighboring UEs.

Further, association with a channel busy ratio (CBR) may be considered. The CBR is a criterion for indicating how busy is the current channel (the congestion level of the surrounding environment) regardless of technologies. The CBR of the specific technology may be obtained by multiplying the criterion with the ratio of UEs that use (or do not use) the specific technology. According to such a measurement metric, the congestion level caused by the UEs using the specific technology of the total congestion level may be deduced.

For example, the CBR for the specific technology may be obtained by multiplying a calculated CBR value with any one of: the ratio of how many times the control signal (PSCCH) indicating the use (or disuse) of the specific technology is decoded to the total control signals (PSCCHs) decoded for the predetermined time; the ratio of how many times the control signal (PSCCH) indicating the use of the specific technology is decoded to the total resources for the candidate control signals (PSCCHs) for the predetermined time; the ratio of how many times the control signal (PSCCH) indicating the specific priority level is decoded to the total control signals (PSCCHs) decoded for the predetermined time; and the ratio of how many times the control signal (PSCCH) indicating the specific priority level is decoded to the total resources for the candidate control signals (PSCCHs) for the predetermined time.

The UE may obtain the ratio of UEs that use (or do not use) the corresponding specific technology or the congestion level based on the technology-specific congestion level measurement according to at least one of the above-described methods.

When a UE desires to use a specific technology, the network may allow the UE to use the specific technology only if the ratio of UEs that use (or do not use) the specific technology satisfies a specific condition. For example, the network may allow the UE to use a new radio technology (e.g., TxD, multi-layer transmission, etc.) only when the congestion level measurement of UEs using the new radio technology is less than a predetermined threshold (in the present disclosure, the multi-layer transmission means that the number of modulated symbols simultaneously transmitted in a specific RE through multiple antennas in MIMO transmission is greater than or equal to N (where N>=2)). A transmit diversity scheme such as space frequency block coding (SFBC) or a multi-layer transmission scheme may cause 2Rx UEs two-dimensional interference or multi-dimensional interference so that the interference cancellation performance of a UE driving a minimum mean square error (MMSE) interference rejection combining (IRC) receiver may be degraded. Thus, the network may allow the UE to use the TxD scheme (or multi-layer transmission) only when the number of UEs using the TxD scheme (or multi-layer transmission) in the vicinity of the network is less than or equal to a predetermined value. To this end, each UE may inform whether the UE uses the TxD scheme using a control signal (or PSCCH). The network may obtain the number of UEs using the TxD scheme (or multi-layer transmission) in the vicinity thereof and then allow the use of the TxD scheme (or multi-layer transmission) only when the number of UEs is less than a predetermined threshold.

The condition that the use of the new radio technology (e.g., TxD, multi-layer transmission, etc.) is allowed may vary depending on the number of UEs using a conventional radio (reception) technology (e.g., MMSE IRC receiver) rather than the number of UEs using the new radio technology (e.g., TxD, multi-layer transmission, etc.). To this end, each UE may transmit its receiver type in a control signal. Specifically, the UE may inform its transmission and/or reception scheme using a control signal or set a different DMRS/scrambling sequence depending on transmission and/or reception schemes. Then, neighboring UEs may determine whether a specific technology is used/applied by detecting/decoding the control signal or DMRS/scrambling sequence. Meanwhile, since it is difficult for a previous-release UE to include information on its transmission and/or reception scheme in a control signal, the previous-release UE may be assumed to use a specific receiver and/or transmitter. Here, the previous-release UE may refer to a UE using the format of a control signal (PSCCH) proposed in the previous release. A new-release UE may include information on its release version, and thus, a UE of which the release is not indicated may be regarded as the previous-release UE. The UE performs blind decoding of control signals on candidate control signal resources for a prescribed period of time. If the ratio of control signals indicating a specific-release UE to the decoded signals is greater than or equal to a predetermined threshold (or less than the predetermined threshold when it is not indicated), the UE may be configured to use a specific transmission scheme. The threshold for determining the use of the specific technology may be provided by an eNB (or the network) to the UE through physical layer signaling or higher layer signaling, or it may be preconfigured.

The eNB (or network) may limit the use of the specific technology based on the number/ratio of UEs using another specific technology in the vicinity thereof. To this end, the eNB (or network) may provide the UE the threshold for the number/ratio of UEs using the other specific technology through physical layer signaling or higher layer signaling. In other words, the eNB (or network) may preconfigure a condition for determining the use of the specific technology (e.g., technology-specific congestion level threshold, priority-specific congestion level threshold, etc.) for the UE.

The UE may report such a measurement to the eNB (or network). In particular, since the measurement may vary in each area, the UE may report the measurement together with area information. Upon receiving the measurement, the eNB (or network) may determine whether the specific technology is allowed in a specific area and a specific resource pool. Although the technology-specific measurement and the priority-specific measurement are described above, release-specific measurement (i.e., a congestion level measurement for UEs using a specific release version) may also be defined. To obtain information about release versions of other UEs, the UE may signal information about its release version to neighboring UEs through physical layer signaling or higher layer signaling.

Meanwhile, the UE may not use a specific transmission scheme temporarily although the UE is capable of using the specific transmission scheme. That is, the UE may stop the use of the specific transmission scheme temporarily since the use of the specific transmission scheme may prevent the previous-release UE from performing reception. Information on the release version or information on the specific transmission scheme may be separately provided by a control signal or a higher layer signal. To reduce the number of bits for indicating the release information, a receiving UE may assume/interpret that when even one field related to the specific technology is set to '1', it means that a corresponding UE is not the previous-release UE.

The present disclosure is not limited to D2D communication. That is, the disclosure may be applied to uplink or downlink communication, and in this case, the proposed methods may be used by an eNB, a relay node, etc. Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 15:
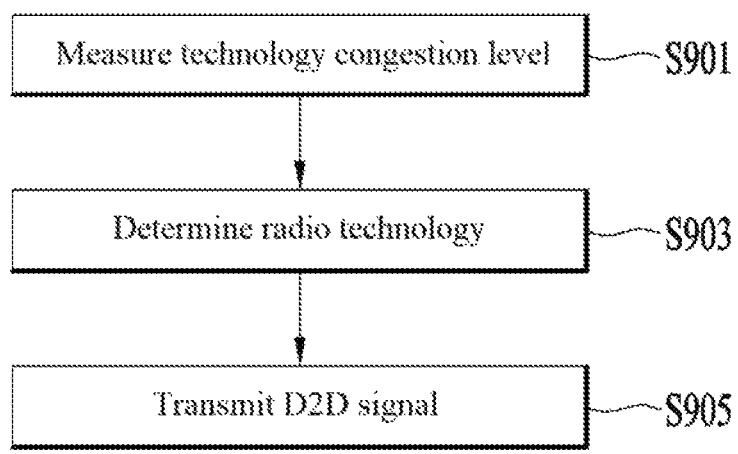
FIG. 15 is a flowchart illustrating a method by which a user equipment (UE) determines a radio technology to be applied to transmission of a D2D signal based on a measured technology congestion level and then transmits the D2D signal.

FIG. 15 is a flowchart illustrating a method by which a UE determines a radio technology to be applied to transmission of a D2D signal based on a measured technology congestion level and then transmits the D2D signal.

Based on the technology congestion level, the UE may determine or select the radio technology to be used or applied when transmitting the D2D signal. For example, when the UE intends to transmit a D2D signal to which a specific radio technology is applied, the transmission may be conditionally allowed in the following cases: when the technology congestion level is greater than or equal to a predetermined value (if the technology congestion level is related to the number of times that the specific radio technology is applied); and when the technology congestion level is less than the predetermined value (if the technology congestion level is related to the number of times that the specific radio technology is not applied). For example, the UE may measure the technology congestion level for the specific radio technology. Only when the measured congestion level is greater than or equal to a predetermined threshold, the UE may determine the specific radio technology as the radio technology to be applied to the D2D signal transmission.

The reason for this is that the D2D signal transmitted with application of the specific radio technology may significantly affect the reception performance of other neighboring UEs if the specific radio technology is TxD, multi-layer transmission, or higher order modulation such as 64-QAM. Specifically, when a D2D signal is transmitted with application of the TxD such as SFBC or the multi-layer transmission, the D2D signal where the TxD or multi-layer transmission is applied may cause two-dimensional interference or multi-dimensional interference to 2Rx UEs, each of which drives the MMSE IRC receiver, so that the signal reception performance of the MMSE IRC receiver may be significantly degraded. Accordingly, the present disclosure proposes that a new communication technology is applied to D2D signal transmission only when the effect of the new communication technology on neighboring UEs using a conventional technology is capable of being minimized.

According to the present disclosure, the technology congestion level may be measured by calculating the ratio of neighboring UEs that use or apply the new radio technology. When the ratio of neighboring UEs that perform signal transmission and reception by applying the new radio technology is greater than or equal to a predetermined threshold ratio, the UE may be allowed to perform the D2D signal transmission according to the new radio technology. When the ratio of the neighboring UEs that perform the signal transmission and reception by applying the new radio technology is less than the predetermined threshold ratio, the UE may perform the D2D signal transmission based on only the conventional radio technology except the new radio technology, that is, the UE may be not allowed to perform the D2D signal transmission based on the new radio technology.

The UE may measure a technology congestion level for the new radio technology or a technology congestion level for the conventional radio technology. When the UE measures the technology congestion level for the conventional radio technology, the UE may perform the D2D signal transmission to which the new radio technology is applied only if the measured technology congestion level is less than a predetermined value.

Further, the specific radio technology the UE desires to apply may be a new radio technology where a new technique such as the TxD, multi-layer transmission, or 64-QAM is applied. Hereinafter, for convenience of description, a specific radio technology or a new radio technology is referred to as a first radio technology (i.e., a radio technology a UE desires to apply), and a radio technology different from the specific radio technology or a conventional radio technology is referred to as a second radio technology.

Referring to FIG. 15, a UE may measure a technology congestion level in a predetermined resource region. To this end, the UE may detect a plurality of signals received in the predetermined resource region for a prescribed period of time and then obtain information on the use of a specific radio technology (or information indicating that the first radio technology is applied) from the signals. Alternatively, the UE may obtain information on the disuse of the specific radio technology. The UE may measure the technology congestion level by calculating the ratio of how many times the information on the use of the specific radio technology is obtained (S901).

The predetermined resource region may correspond to multiple resource pools or resource regions which are preconfigured for D2D communication. The information on the use of the specific radio technology may refer to information for identifying a radio technology applied to or used for signal transmission and reception. The information on the use of the specific radio technology may correspond to indication information directly indicating a radio technology applied to the signal or signal property information predetermined for identifying a radio technology applied to the signal. The UE may obtain the information on the use of the specific radio technology included in the signal, measure the ratio of how many times the signal including the information on the use or disuse of the specific radio technology is received, and then determine the technology congestion level based on the measured ratio.

Specifically, the UE may receive the plurality of signals in the predetermined resource region for the prescribed period of time, decode each of the plurality of signals, and then obtain the information on the use of the specific radio technology or the information indicating the ratio technology applied to the signal, which is included in the signal. The specific radio technology refers to a radio technology that the UE desires to apply when transmitting a D2D signal. Depending on the technology congestion level, either the specific radio technology or a radio technology different from the specific radio technology may be determined as the radio technology for the D2D signal transmission.

The UE may determine the technology congestion level by measuring the ratio of how many times the signal including the information on the use of the specific radio technology is received to the total number of signals received for the prescribed period of time. For example, when the UE receives 20 signals for the prescribed period of time (transmitted from 20 UEs) and when the number of signals including the information on the use of the specific radio technology (or the radio technology that the UE desires to use for the D2D signal transmission) is 5, the UE may determine that the technology congestion level is 25%.

A D2D signal transmitted with the first radio technology may be identified by the signal properties of a D2D signal transmitted with the second ratio technology. In this case, the UE may identify the properties of each received signal by decoding the received signals and then obtain information on radio technologies applied to the received signals from the properties. The properties of the signal may include the structure of a DMRS mapped to the signal, the sequence and CP length of the signal, etc.

Specifically, the UE may obtain the information on the radio technology included in the received signal from the DMRS mapping structure of the received signal. For example, when a new radio technology is the first radio technology and a conventional radio technology is the second radio technology, the DMRS mapping structure of a signal transmitted with application of the first radio technology may be different from the DMRS mapping structure of a signal transmitted with application of the second radio technology. In this case, the UE may identify or recognize, based on the structure of the DMRS mapped to the received signal, whether information on the use of the first radio technology or information on the use of the second radio technology is included in the received signal. For example, the DMRS mapping structure used in the first radio technology, i.e., new radio technology may be different from that used in the second radio technology, i.e., conventional radio technology. In this case, if the received signal has a non-conventional DMRS mapping structure, the UE may recognize that the received signal includes the information on the use of the first radio technology (or the received signal indicates that the first radio technology is applied thereto). The UE may check the DMRS mapping structure of each signal received in the predetermined resource region for the prescribed period of time, calculate the ratio of signals where the first radio technology is applied (or signals where the first radio technology is not applied) to the total received signals, and then measure the technology congestion level.

The UE may obtain the information on the use of the radio technology included in the received signal from the CP length of the received signal. For example, the CP length of a signal transmitted with application of the first radio technology may be different from the CP length of a signal transmitted with application of the second radio technology. In this case, the UE may identify or recognize, based on the CP length of the signal, whether the information on the use of the first radio technology or the information on the use of the second radio technology is included in the received signal. For example, the CP length used in the first radio technology, i.e., new radio technology may be different from that used in the second radio technology, i.e., conventional radio technology. In this case, if the received signal has a non-conventional CP length, the UE may recognize that the received signal includes the information on the use of the first radio technology (or the received signal indicates that the first radio technology is applied thereto). The UE may check the CP length of each signal received in the predetermined resource region for the prescribed period of time, calculate the ratio of signals where the first radio technology is applied (or signals where the first radio technology is not applied) to the total received signals, and then measure the technology congestion level.

Similarly, the sequence of a signal may be configured differently depending on the radio technology. The UE may obtain the information on the use of the radio technology included in the signal from the sequence. However, it should be noted that the present disclosure is not limited to above-described signal properties such as a DMRS mapping structure, a CP length, and a sequence and may further include other properties if the information on the use of the radio technology included in the signal is capable of being identified.

The signal may include information about a release version. In this case, the UE may obtain the information on the use of the radio technology from the signal based on the information about the release version. That is, the UE may assume, based on the information about the release version, which radio technology is applied to the signal for both transmission and reception and then obtain the information on the use of the radio technology included in the signal based on the assumed radio technology.

When the information about the release version is included in the signal, the UE may assume that the information on the use of the first radio technology is included. The reason for this is that when a radio technology in the previous release is used, the information about the release version is not included in the signal. In other words, when the information about the release version is included in the signal, the UE may assume that the signal is transmitted with the new radio technology, i.e., first ratio technology. Meanwhile, one bit may be used to include the information about the release version in the signal. In this case, if the bit is 1, the UE may determine that the first radio technology is applied to the received signal when decoding the received signal.

The UE may determine the technology congestion level based on the ratio of control signals including the information on the use of the specific radio technology to multiple control signals received in a predetermined (resource) region. In other words, the UE may calculate the ratio of UEs using the specific radio technology to neighboring UEs transmitting and receiving control signals in the predetermined (resource) region and then determine the technology congestion level based thereon. For example, when 12 control signals are received in the predetermined resource region, if 6 control signals uses the specific radio technology, the UE may know that the ratio of the control signals transmitted with the specific radio technology to the total received control signals is 50% and determine the technology congestion level based thereon. The number of control signals may be equal to the number of neighboring UEs, and the number of control signals may be calculated by assuming control signals having the same UE ID as one control signal.

A control signal (PSCCH) may be used as the signal including the information on the use of the radio technology. The UE may decode control signals received in the predetermined resource region. After decoding the control signals, the UE may obtain the information on the use of the radio technology included in the control signals. The UE may determine whether the information on the use of the radio technology included in the control signal contains the information on the use of the specific radio technology that the UE desires to use. The UE may calculate the ratio of control signals including the information on the use of the specific radio technology to the total received control signals. The UE may determine the calculated ratio as the technology congestion level.

The predetermined resource region may be a candidate resource region assigned for transmission and reception of the control signal (PSCCH). In this case, the UE may measure the ratio of a resource region in which the control signal including the information on the use of the specific radio technology is decoded to the candidate resource region and then determine the technology congestion level based on the measured ratio. In other words, the UE may calculate the ratio of a resource region in which the control signal including the information on the use of the specific radio technology is received to a resource region (or resources) allocated for transmitting and receiving the control signal and then determine the technology congestion level based thereon.

The UE may determine the technology congestion level based on the ratio of subchannels on which the signal including the information on the use of the specific radio technology is received to a plurality of subchannels included in the predetermined (resource) region. For example, when there are a total of 10 subchannels in the predetermined resource region and control signals to which the specific radio technology is applied are received on 6 subchannels, the UE may know that the ratio is 60% and determine the technology congestion level based on the ratio of 60%.

The UE may further consider the received strength of a signal to which the specific radio technology is applied. That is, the UE may determine the technology congestion level by considering the number of signals having received strength greater than a predetermined threshold among signals including the information on the use of the specific radio technology.

The UE may measure a CBR in the predetermined resource region based on the strength of a received signal and then determine the technology congestion level by further considering the measured CBR. Specifically, the UE may calculate the ratio of how many times the signal including the information on the use of the specific radio technology is received in the predetermined resource region, multiply the measured CBR with the calculated ratio, and then estimate a technology congestion level caused by UEs using the specific radio technology of the total congestion level.

The UE may determine or select the radio technology to be used or applied for the D2D signal transmission based on the technology congestion level. Only when the technology congestion level (determined based on the ratio of signals where the specific radio technology is applied) is greater than or equal to a predetermined threshold, the UE may be allowed to transmit a D2D signal to which the specific radio technology is applied For example, the UE may measure the technology congestion level for the specific radio technology. Only when the measured technology congestion level is greater than or equal to the predetermined threshold, the UE may determine the specific radio technology as the radio technology applied to the D2D signal transmission. Here, the specific radio technology refers to a new radio technology the UE desires to apply (S903).

The UE may receive information indicating whether the technology congestion level is applied and information on the predetermined threshold in advance from an eNB. When the eNB requests the UE to apply the technology congestion level, the UE may determine the technology congestion level. If specific conditions are satisfied, the UE may transmit the D2D signal by applying the specific radio technology.

For example, when the UE desires to transmit the D2D signal to which the first radio technology, i.e., new radio technology is applied, the UE may determine the technology congestion level based on the ratio of signals including the information on the use of the first radio technology (or indication information indicating that the first radio technology is used) to the multiple signaled received in the predetermined resource region. In this case, if the determined measured technology congestion level is greater than or equal to a predetermined threshold, the UE may determine the first radio technology as the radio technology applied to the D2D signal transmission. If the technology congestion level is less than the predetermined threshold, the UE may determine the second radio technology as the radio technology applied to the D2D signal transmission.

On the other hand, the UE may also determine the technology congestion level based on the ratio of signals including the information on the use of the second radio technology (or indication information indicating that the first radio technology is not used) to the multiple signaled received in the predetermined resource region. When the technology congestion level is less than the predetermined threshold, the UE may apply the first radio technology. When the technology congestion level is greater than or equal to the predetermined threshold, the UE may not apply the first radio technology.

Next, the UE may transmit the D2D signal based on the determined radio technology. For example, when the determined radio technology is a radio technology such as the TxD or multi-layer transmission, the UE may transmit the D2D signal by applying the TxD or multi-layer transmission. When the determined radio technology is not the TxD or multi-layer transmission but a conventional radio technology, the UE may transmit the D2D signal by applying the conventional radio technology (S905).

Figure 16:
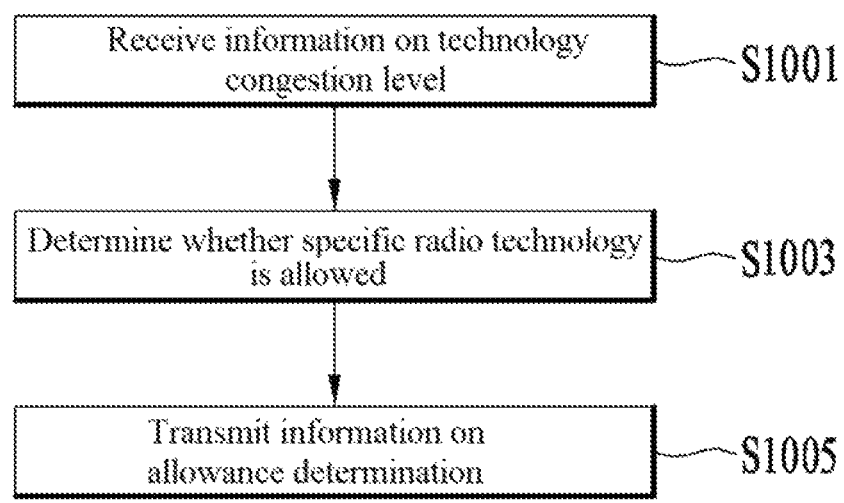
FIG. 16 is a flowchart illustrating a method by which an evolved node B (eNB) controls D2D signal transmission at a UE based on a measured technology congestion level according to an embodiment of the present disclosure.

FIG. 16 is a flowchart illustrating a method by which an eNB controls D2D signal transmission at a UE based on a measured technology congestion level according to an embodiment of the present disclosure.

Referring to FIG. 16, the eNB may receive a report on a technology congestion level measured for a predetermined resource region from the UE. As described above with reference to FIG. 15, the technology congestion level is measured by the UE based on the ratio of signals including information on the use of a specific radio technology. For example, the technology congestion level is related to the ratio of UEs using the specific radio technology to neighboring UEs thereof. The eNB may determine the ratio of the number of neighboring UEs using the specific radio technology to the total number of neighboring UEs based on the received technology congestion level. As a radio technology the UE desires to apply, the specific radio technology may be a new radio technology different from conventional radio technologies. Meanwhile, the eNB may receive signals from neighboring UEs and decode the received signals in order to measure and determine the technology congestion level. In this case, the eNB may apply the technology congestion level determination methods, which are described above with reference to FIG. 15, to directly measure the technology congestion level (S1001).

The eNB may determine, based on the reported technology congestion level, whether to allow the UE perform D2D signal transmission with the specific radio technology. For convenience of description, when a UE transmits a D2D signal based on a new radio technology such as the TxD, multi-layer transmission, or 64-QAM, the new radio technology may be referred to as the first radio technology and other radio technologies except the new radio technology (e.g., a conventional radio technology used before the new radio technology) may be referred to as the second radio technology.

Based on the technology congestion level, the eNB may determine the ratio of UEs performing D2D signal transmission and reception with the first radio technology to UEs located close to the UE or the ratio of UEs performing the D2D signal transmission and reception with the second radio technology to the UEs located close to the UE. In this case, if the ratio of the UEs using the second radio technology (e.g., the technology congestion level for the second radio technology) is greater than or equal to a first threshold, which is predetermined, or when the ratio of the UEs using the first radio technology, i.e., new radio technology (e.g., the technology congestion level for the first radio technology) is less than a second threshold, the eNB may not allow the UE to use the first radio technology, i.e., new radio technology. That is, the eNB may determine that the UE is not allowed to transmit a D2D signal with the first radio technology (S1003).

Alternatively, the eNB may determine whether to allow the UE to apply or use the first radio technology by considering the ratio of how many UEs use a radio technology related to the MMSE IRC receiver among the UEs using the second radio technology based on the technology congestion level based on the technology congestion level. In this case, the eNB may detect a change in the number of UEs using the radio technology related to the MMSE IRC receiver based on the reported technology congestion level. If the number of detected UEs is greater than or equal to a predetermined value, the eNB may not allow the UE to transmit a D2D signal with the first radio technology.

The eNB may not only receive technology congestion levels from UEs but also receive geographical information about the UEs therefrom. In this case, the eNB may determine whether to allow the UEs to perform D2D signal transmission with the first radio technology by considering the technology congestion levels and geographical information. In particular, the eNB may make a different determination depending on the geographical information.

The UE may transmit, to the UEs, information on whether the application or use of the first radio technology is allowed (sS1005). In this case, the UEs may determine whether to perform the D2D signal transmission with the first radio technology based on the eNB's determination.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. It may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 17:
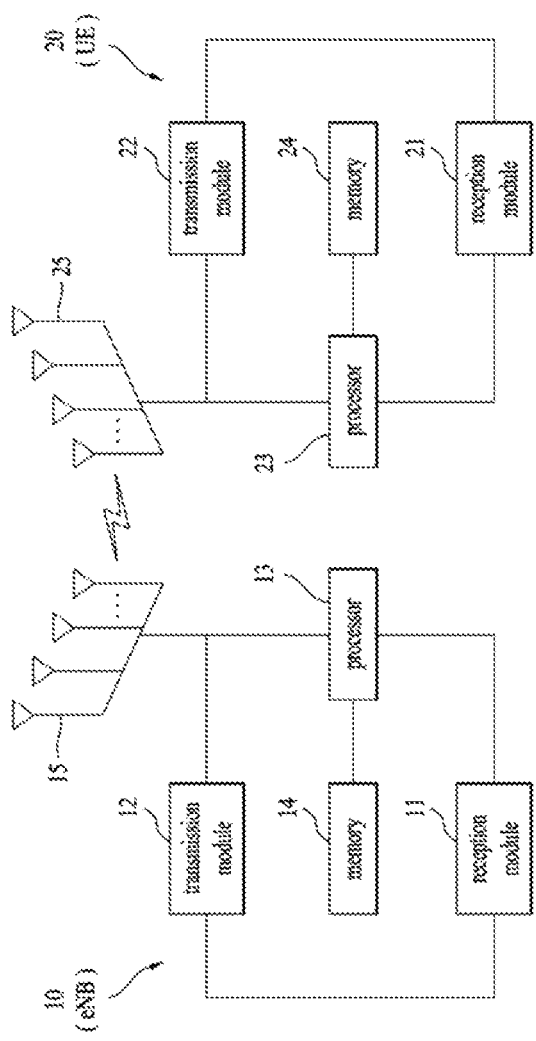
FIG. 17 is a diagram schematically illustrating the configurations of a UE and an eNB according to an embodiment of the present disclosure.

FIG. 17 is a diagram schematically illustrating a UE and an eNB for performing D2D communication according to the present disclosure.

Referring to FIG. 17, the UE 20 according to the present disclosure may include a receiving device 21, a transmitting device 22, a processor 23, a memory 24, and a plurality of antennas 25. The plurality of antennas 25 may mean that the UE 20 supports MIMO transmission and reception. The receiving device 21 may be configured to receive various signals, data, and information from the eNB in DL. The transmitting device 22 may be configured to transmit various signals, data, and information to the eNB in UL. The processor 23 may be configured to control overall operations of the UE 20.

The processor 23 of the UE 20 may be configured to perform the operations described in the embodiments of the present disclosure. Specifically, the processor 23 may be configured to control the receiving device 21 to measure a technology congestion level based on signals received in a predetermined resource region, which are transmitted from other neighboring UEs. The processor 23 may be configured to control the transmitting device 22 to determine or select a radio technology to be applied to D2D signal transmission based on the technology congestion level. The processor 23 may be configured to control the transmitting device 22 such that the determined radio technology is used for or applied to the D2D signal transmission. The processor 23 may be configured to control the receiving device 21 to receive signals from UEs in the predetermined resource region, decode the received signals, and determine the technology congestion level by measuring the ratio of how many signals include information on the use of a specific (radio) technology.

As described above with reference to FIG. 15, the specific radio technology that the UE desires to apply may be a new radio technology where a new technique such as the TxD, multi-layer transmission, or 64-QAM is applied. Hereinafter, for convenience of description, a specific radio technology or a new radio technology is referred to as a first radio technology (i.e., a radio technology a UE desires to apply), and a radio technology different from the specific radio technology or a conventional radio technology is referred to as a second radio technology.

The processor 23 may be configured to decode signals received in the predetermined (resource) region and determine the technology congestion level based on the ratio of signals including information on the use of the first radio technology to the signals or predetermined region. If the technology congestion level is greater than or equal to a predetermined threshold, the processor 23 may be configured to determine the first radio technology as the radio technology for the D2D signal transmission. If the technology congestion level for the first radio technology is less than the predetermined threshold, the processor 23 may be configured to determine the second radio technology as the radio technology for the D2D signal transmission.

When the specific radio technology is the second radio technology, if the technology congestion level is greater than or equal to the predetermined threshold, the processor 23 may be configured to determine the first radio technology as the radio technology to be applied to the D2D signal transmission. The first radio technology may be a radio technology related to the TxD, multi-layer transmission, or 64 QAM. The processor 23 may be configured to obtain the information on the use of the specific radio technology based on the properties of the signal. The properties of the signal may include at least one of a CP length, a sequence, and a DMRS allocated for the signal. The signal may include indication information indicating a radio technology applied to the signal, and the processor 23 may be configured to obtain the information on the use of the specific radio technology based on the indication information included in the signal. The processor 23 may be configured to obtain the information on the use of the specific radio technology based on a priority level related to the signal. The predetermined resource region may be a resource region to which resources for a control signal are allocated. The processor 23 may be configured to determine the technology congestion based on the ratio of control signals including the information on the use of the specific radio technology to control signals received in the predetermined resource region for a predetermined time. The signal including the information on the use of the specific radio technology may be a signal having received strength greater than or equal to a predetermined threshold. The processor 23 may be configured to determine the technology congestion level based on the ratio of subchannels on which the signal including the information on the use of the specific radio technology is received to a plurality of subchannels included in the predetermined resource region. The processor 23 may be configured to measuring a CBR corresponding to a channel occupation ratio based on the strength of the signals received in the predetermined resource region and calculate the technology congestion level in consideration of the ratio of how many times the signal including the information on the use of the specific radio technology is received in the predetermined resource region and the measured CBR.

The processor 23 of the UE 20 may be configured to perform functions of processing information received by the UE 20 or information to be transmitted by the UE 20. The memory 24 may be configured to store the processed information for a prescribed time and replaced with a component such as a buffer (not shown in the drawing).

With continued reference to FIG. 16, the eNB 10 according to the present disclosure may include a receiving device 11, a transmitting device 12, a processor 13, a memory 14, and a plurality of antennas 15. The plurality of antennas 15 may mean that the eNB 10 supports MIMO transmission and reception. The receiving device 11 may be configured to receive various signals, data, and information from the UE in UL. The transmitting device 12 may be configured to transmit various signals, data, and information to the UE in DL. The processor 13 may be configured to control overall operations of the eNB 10.

The processor 13 of the eNB 10 may be configured to perform the operations described in the embodiments of the present disclosure. The processor 13 may be configured to control the receiving device 11 to obtain information on a technology congestion level from a signal received from the UE 20. The processor 13 may be configured to determine, based on the technology congestion level, whether the use of the first radio technology is allowed, which is described above with reference to FIG. 16.

The processor 13 may be configured to control the transmitting device 12 to transmit the result of whether the use of the first radio technology is allowed. That is, the processor 13 may be configured to control D2D signal transmission at the UE 20. The processor 13 may be configured to control the receiving device 11 to receive signals from UEs in a predetermined resource region. The processor 13 may be configured to decode the received signals and measure and determine the technology congestion level based on the ratio of how many times the first radio technology is used. When the technology congestion level for the first radio technology is greater than or equal to a predetermined threshold, the processor 13 may be configured to allow D2D signal transmission with the first radio technology. When the technology congestion level for the first radio technology is less than the predetermined threshold, the processor 13 may be configured to prohibit the D2D signal transmission with the first radio technology.

The processor 13 of the eNB 10 may be configured to perform functions of processing information received by the eNB 10 or information to be transmitted by the eNB 10. The memory 14 may be configured to store the processed information for a prescribed time and replaced with a component such as a buffer (not shown in the drawing).

The eNB 10 and the UE 20 may be implemented such that the above-described embodiments of the present disclosure are independently implemented or two or more embodiments are simultaneously implemented. Here, redundant descriptions are omitted for clarity.

The details of the eNB 10 described with reference to FIG. 17 may be equally applied to a relay device operating as a DL transmission entity or a UL reception entity, and the details of the UE 20 may be equally applied to a relay device operating as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink signal by a user equipment (UE) in a wireless communication system supporting sidelink communication, the method comprising:
    configuring a resource pool for the sidelink signal;
    receiving a plurality of Physical Sidelink Control Channels (PSCCHs) in the resource pool for a predetermined period;
    measuring a congestion level based on the received plurality of PSCCHs;
    selecting transmission resources for a transmission of the sidelink signal within the resource pool; and
    transmitting the sidelink signal in the transmission resources based on the congestion level,
    wherein the congestion level is a ratio of PSCCHs to which a transmit diversity (TxD) transmission scheme is applied among the plurality of PSCCHs, and
    wherein the sidelink signal is transmitted by applying the TxD transmission scheme based on the ratio of PSCCHs to which the TxD transmission scheme greater than a predetermined threshold.

2. The method of claim 1, the sidelink signal is transmitted without applying the TxD transmission scheme based on the congestion level less than a predetermined threshold.

3. The method of claim 1, wherein whether the TxD transmission scheme is applied to the PSCCHs is determined based on properties of the PSCCHs.

4. The method of claim 3, wherein the properties of the PSCCHs includes at least one of a cyclic prefix (CP) length, a sequence, and a demodulation reference signal (DMRS) allocated for the signal.

5. The method of claim 1, wherein the PSCCHs include information on whether the TxD is applied.

6. The method of claim 1, wherein the ratio of the PSCCHs to which the TxD transmission scheme is applied is determined based on information on a priority level included in the corresponding PSCCHs.

7. The method of claim 1, wherein the signal is a control signal that includes information related to the application of the TxD.

8. The method of claim 1, wherein the signal related to the specific radio technology is a signal having received strength greater than or equal to a predetermined signal strength.

9. A user equipment (UE) for transmitting a sidelink signal in a wireless communication system supporting sidelink communication, the UE comprising:
    a transceiver; and
    a processor configured to:
        configure a resource pool for the sidelink signal;
        receive a plurality of Physical Sidelink Control Channels (PSCCHs) in the resource pool for a predetermined period;
        measure a congestion level based on the received plurality of PSCCHs;
        select transmission resources for a transmission of the sidelink signal within the resource pool; and
        transmit the sidelink signal in the transmission resources based on the congestion level,
    wherein the congestion level is a ratio of PSCCHs to which a transmit diversity (TxD) transmission scheme is applied among the plurality of PSCCHs, and
    wherein the sidelink signal is transmitted by applying the TxD transmission scheme based on the ratio of PSCCHs to which the TxD transmission scheme greater than a predetermined threshold.

* * * * *